United States Patent [19]
Bragg et al.

[11] Patent Number: 6,140,942
[45] Date of Patent: Oct. 31, 2000

[54] AIRCRAFT SURFACE CONTAMINATION SENSING SYSTEM USING CONTROL SURFACE HINGE MOMENT MEASUREMENTS

[75] Inventors: Michael B. Bragg, Champaign, Ill.; Holly M. Gurbacki, Cheektowaga, N.Y.

[73] Assignee: Board of Trustees of the University of Illinois, Urbana, Ill.

[21] Appl. No.: 09/344,018

[22] Filed: Jun. 25, 1999

[51] Int. Cl.$^7$ .................................................. G08B 21/00
[52] U.S. Cl. ......................... 340/962; 340/945; 340/966; 340/601; 73/170.26; 73/763
[58] Field of Search ................................... 340/962, 945, 340/966, 601; 73/170.26, 170.16, 760, 763, 769, 867.08

[56] References Cited

U.S. PATENT DOCUMENTS

| | | | |
|---|---|---|---|
| 4,611,492 | 9/1986 | Koosmann | 73/579 |
| 5,680,124 | 10/1997 | Bedell et al. | 340/945 |
| 5,686,907 | 11/1997 | Bedell et al. | 340/945 |
| 5,823,473 | 10/1998 | Odell et al. | 244/129.5 |
| 6,052,056 | 4/2000 | Burns et al. | 340/583 |

OTHER PUBLICATIONS

M.B. Bragg, "Aircraft Aerodynamic Effects Due to Large Droplet Ice Accretions", 34th Aerospace Sciences Meeting & Exhibit, Jan. 15–18, 1996, Reno, Nevada.

M.B. Bragg, W.R. Perkins, N.B. Sarter, T. Basar, P.G. Voulgaris, H.M. Gurbacki, J.W. Melody, S.A. McCray, "An Inter–disciplinary Approach to Inflight Aircraft Icing Safety", 36th Aerospace Sciences Meeting & Exhibit, Jan. 12–15, 1998, Reno, NV.

M.B. Bragg, H. Gurbacki, "Sensing Aircraft Icing Effects by Flap Hinge Moment Measurement", 17th AIAA Applied Aerodynamics Conference, Jun. 28–Jul. 1, 1999, Norfolk, Virginia.

O.K. Trunov, M. Ingelman–Sundberg, "On the Problem of Horizontal Tail Stall Due to Ice", *The Swedish–Soviet Working Group on Scientific–Technical Cooperation in the Field of Flight Safety*, Report No. JR–3, 1985.

M. Broeren, M. Bragg, "Sensing the Effect of Ice Accretion on Aircraft Control", NASA, SBIR proposal, Jul. 2, 1998.

M. Bragg, W. Perkins, N. Sarter, "Aircraft Icing Research Center", Critical Research Initiatives proposal, UIUC, Jul. 1, 1997.

H. Gurbacki, M. Bragg, "Sensing Control Problems by Use of Unsteady Flow Measurements", presentation to UIUC engineers and FAA engineers. Urbana, IL, Nov. 12, 1997.

(List continued on next page.)

*Primary Examiner*—Benjamin C. Lee
*Attorney, Agent, or Firm*—Greer, Burns & Crain, Ltd.

[57] ABSTRACT

A method and system for sensing surface contamination on an aircraft having a control surface. A control element including the control surface is connected to the aircraft by a hinge. The method and system sense a control surface hinge moment about a line on the hinge of the aircraft. A control surface steady hinge moment coefficient is calculated from control surface hinge moment data representing the hinge moment over a period of time. An unsteady hinge moment is calculated which is dependent on the control surface steady hinge moment coefficient. By using a value which is relatively constant during uncontaminated surface conditions, this value can be compared against calculated values to check for variations. If the calculated unsteady value varies from the known uncontaminated values, a warning may be given, alerting an operator of unsafe conditions. This warning is given before a critical value is reached, allowing the operator a period of time to react to the warning. Alternatively, flight control systems may be notified so they may take corrective action.

18 Claims, 5 Drawing Sheets

OTHER PUBLICATIONS

M. Bragg, P. Voulgaris, N. Sarter, "Smart Icing Systems", proposal to NASA, Jul. 1998.

M. Bragg, H. Gurbacki, "Unsteady Flow about an Iced Airfoil", proposal to NASA, Feb. 1, 1999.

D.A. Pruzan, A.A. Khatkhate, J.J. Gerardi, G.A. Hickman "Smart Skin Technology Development for Measuring Ice Accretion, Stall, and High AOA Aircraft Performance", *Surface Pressure Separation/Stall Detector Development*, Final Technical Report of SBIR proposal (Part 2), Apr. 23, 1993.

J.M. Maris, "Airfoil Performance Monitoring Using the Turbulence Intensity Parameter", *Proceedings of the FAA International Conference on Aircraft Inflight Icing*, vol. II, Working Group Papers, Final Report, DOT/FAA/AR–96/81, II,pp. 601–608, Aug. 1996.

D. Cronin, J. Vogel, M. Lamb, "Analytical Development and Experimental Results of a Method for Aerodynamic Contamination Detection", International Icing Symposium, Sep. 18–21, 1995.

AIRCRAFT SURFACE CONTAMINATION SENSING SYSTEM USING CONTROL SURFACE HINGE MOMENT MEASUREMENTS

FIELD OF THE INVENTION

This invention relates generally to a method and apparatus for protecting aircraft from catastrophic effects of surface contamination, mostly icing, on aircraft control surfaces. More specifically, it relates to measuring a control surface hinge moment coefficient to determine a change due to surface contamination.

BACKGROUND OF THE INVENTION

Currently, a problem exists when an aircraft encounters conditions that could cause ice accretion on an airfoil. The airfoil is the two-dimensional cross-section of a wing or tail of which a control surface, such as on a flap, rudder or elevator is a part. An ice shape can form, creating a reduction in lift, increased drag, change in pitching and hinge moments and a loss of control of the aircraft. Performance is affected by altering the pressure distribution over the airfoil. For example, a premature airfoil stall may occur and can result from a steep angle of attack, a large flap deflection or a high ice ridge. The pressure acting on the upper surface of the flap is reduced and an upward unsteady force is imposed on the flap and acts to deflect the flap in that direction. The flap is essentially sucked upward by the lower pressure.

This abrupt ice-induced flow separation can lead to a sudden significant change in hinge moment, leaving insufficient time for the pilot to react correctly. Such occurrences have led to aircraft accidents in the past. Therefore, it is desirable to sense impending problems and to develop systems to correct or protect against them before a crash becomes inevitable.

The Ice Protection System or IPS, is currently being used to protect planes from ice accretion. IPS often combines de-icing techniques and anti-ice systems to provide aircraft protection. However, it is impractical for the IPS to be able to anti-ice the entire aircraft, and a situation may arise where such a system fails.

Due to this concern, another level of protection is under consideration to add to the current IPS, which would increase in-flight pilot awareness of icing effects by monitoring and possibly predicting degraded aerodynamic performance. The systems under development thus far detect the presence and extent of separated flow. Such flow unsteadiness can be sensed by measurement of surface pressure or velocity fluctuations as a function of time.

One example of such a sensor is the Aircraft Icing Performance Monitoring Systems, AIMS. AIMS measures pressure fluctuations on the low-pressure side of the wing. The Stall Warning Plus system also measures pressure by use of high-frequency solid-state pressure sensors. It senses contamination by monitoring both the fluctuating and steady components of local velocity. Another device collects time-dependent pressure measurements by an array of differential pressure sensors.

Each of these systems monitor potential contamination by measuring surface pressure fluctuations. However, these sensors only measure ice effects at a single point on the surface. Also, since these sensors rest on an outside surface of the aircraft, they are susceptible to environmental wear and may be plugged by ice or damaged by a foreign object.

Therefore, there is a need for an icing sensing device which measures the integrated effect of ice over an entire area of concern. Also, there is a need for a sensor which is resistant to operational and environmental wear, such as being damaged by ice or other foreign objects.

Accordingly, it is an object of the present invention to provide a new and improved aircraft surface contamination sensor and method which measures the integrated effect of ice over an entire area of concern.

Yet another object of the present invention is to provide a sensor which is resistant to operational and environmental wear, such as being plugged by ice or damaged by other foreign objects.

Another object of the present invention is to warn a pilot or operator of potentially unsafe conditions before they occur, giving the pilot time to change controls of the aircraft.

SUMMARY OF THE INVENTION

These and other needs are met or exceeded by the present aircraft surface contamination sensing system and method. The invention utilizes a sensor which can be located on or within any control element, such as a flap, rudder or elevator. The sensor senses a hinge moment over time. The sensor outputs this information to a processor which then calculates a control surface hinge moment coefficient. By then analyzing the control surface steady and/or unsteady hinge moment coefficients, the control surface hinge moment coefficient can be compared against a clean control surface value. Once the control surface hinge moment coefficient deviates from the clean value but before it reaches a critical value, an appropriate system may be notified. For example, the aircraft pilot may be alerted and can modify the flight controls accordingly. Alternatively, corrective flight systems could be notified.

DETAILED DESCRIPTION OF THE DRAWINGS

The present invention provides a sensing system for detecting surface contamination, most commonly icing conditions, on an aircraft, having a control surface which includes a hinge. The sensing system utilizes a sensor and a processor. A display device may be used to indicate a pilot warning. It is also contemplated that the processor may output a signal to a flight correction system, for example. The detector senses a control surface hinge moment and then outputs this information over time to the processor. By analyzing this data along with other known factors, the processor obtains a control surface hinge moment coefficient. The control surface hinge moment coefficient is then transferred into a function of an angle of attack. At safe angles of attack, the function stays relatively constant. The measured value is compared against the clean or no-ice value which is roughly a constant. If the measured value deviates from this value, the processor produces an output signal which may be sent to a display device, for example. In a preferred embodiment, the display device then alerts the pilot so that adjustments to the controls can be made, avoiding a possible accident.

Figure 1:
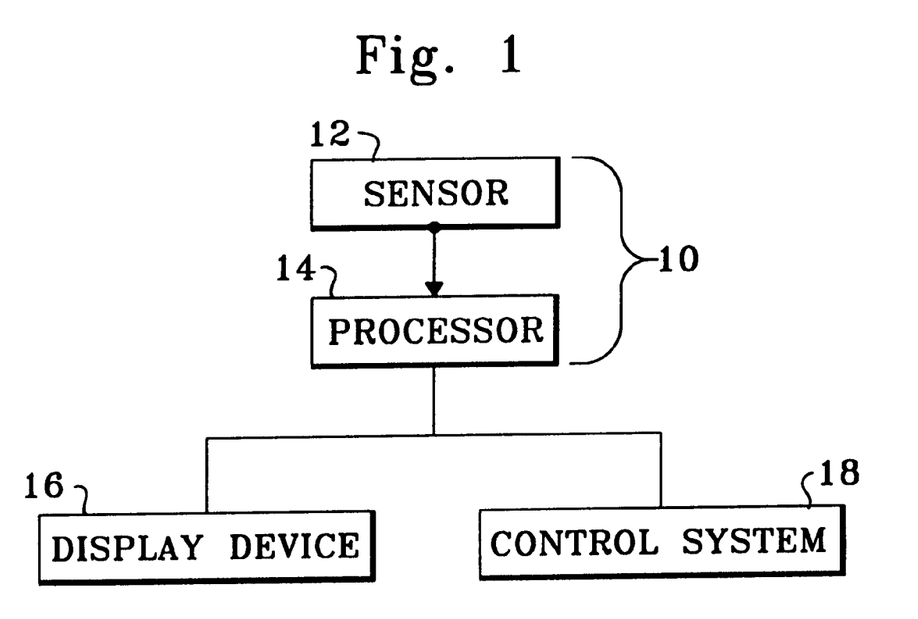
FIG. 1 is a block diagram of a sensing system constructed in accordance with the present invention.

FIG. 1 shows a block diagram of the sensing system 10. The sensing system 10 includes two main elements, a sensor 12 for sensing control surface hinge moment data and a processor 14 for analyzing the data. The sensing system output may be directed to a display device 16 for displaying a warning should it be needed. Also shown is a flight control system 18. It is contemplated that the processor 14 could output to the flight control system 18 as an alternative to or an addition to the display 16. The detector 12 may be a standard strain gauge detector which senses the control surface hinge moment. Other devices capable of detecting the hinge moment, directly or indirectly, are also suitable. Importantly, the sensor 12 may be mounted within the control element to protect it from the environment.

Figure 2:
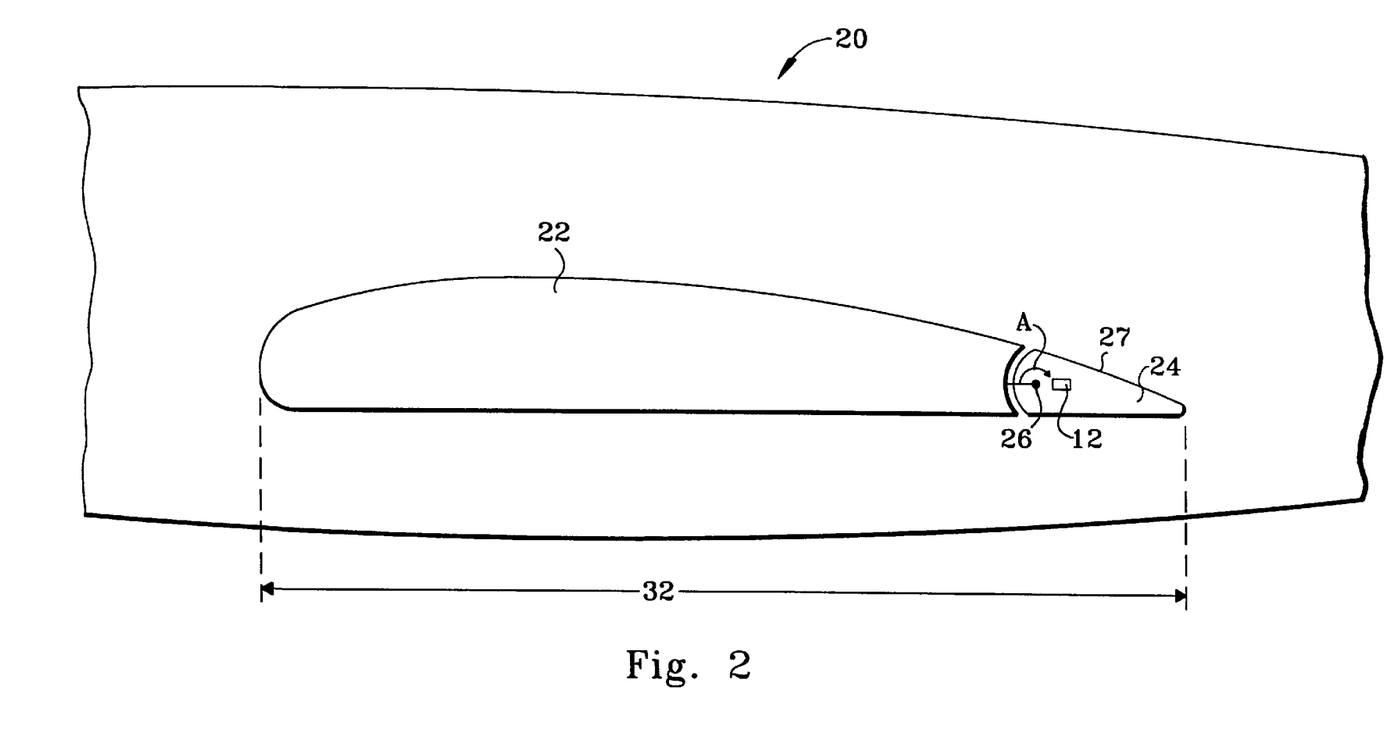
FIG. 2 is an isometric cross-sectional view of an aircraft wing.
Figure 3:
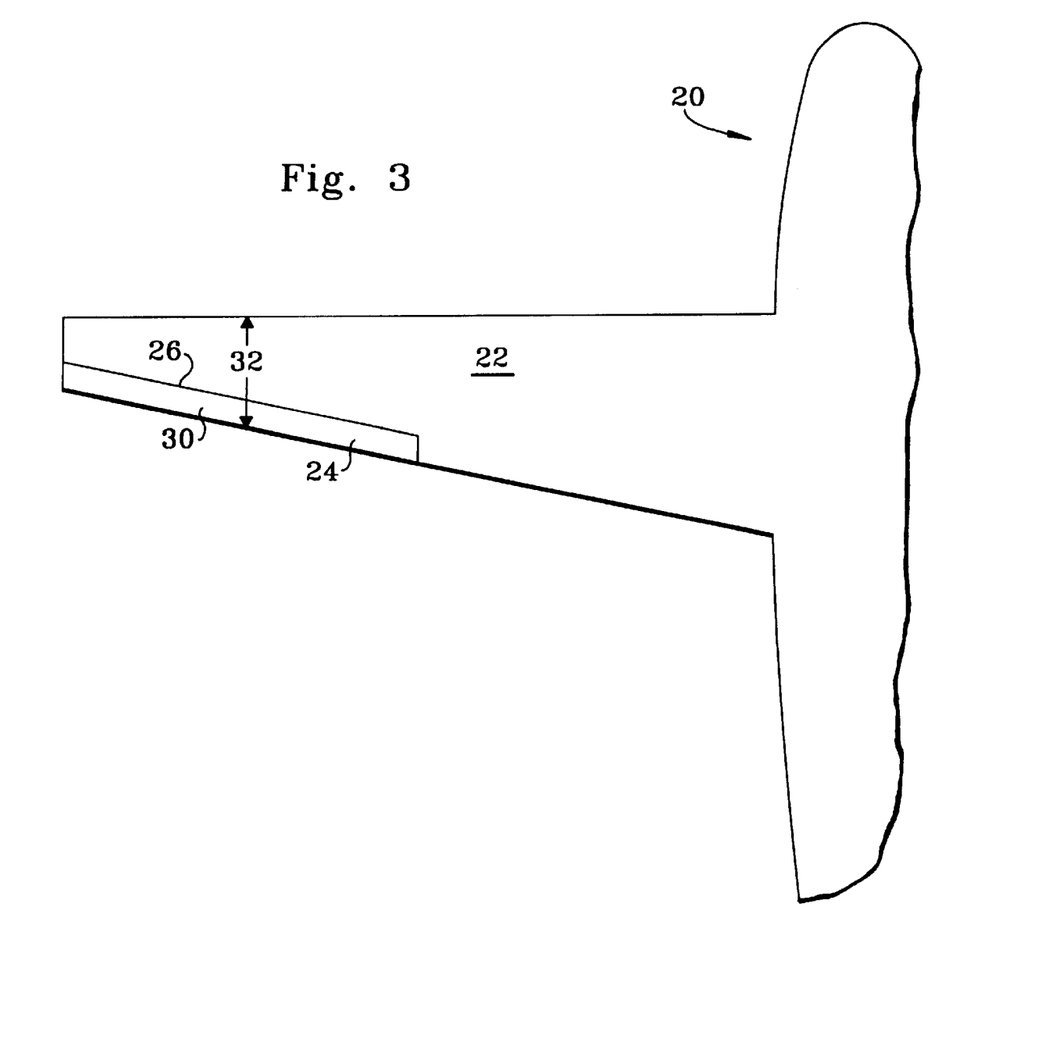
FIG. 3 is a top view of an aircraft wing, illustrating dimensions that the sensing system will use in calculations.

Turning now to FIG. 2, the function of the sensor 10 will now be described with respect to an aircraft, generally labeled 20. The sensor 10 is for use on an aircraft 20 of standard design having a hinged control surface such as the surface of a flap. In FIG. 2, a wing 22 with a flap 24 are shown. As illustrated, the flap 24 includes a hinge line 26 which has a control surface hinge moment indicated by an arrow A. The flap 24 can be contaminated, for example, with ice. Dimensionally, the flap 24 includes a control surface area 30 and a control surface chord length 32, best seen in FIG. 3. The measurements of the control surface area 30 and the control surface chord length 32 are constant values that are stored for use by the processor 14. The sensor 12 is preferably mounted within the flap 24. Also stored for use by the processor 14 is information sufficient to calculate the dynamic pressure, i.e., the kinetic energy of the surrounding air. The dynamic pressure is calculated by taking one-half of the air density times the velocity of the aircraft squared, and accordingly is calculated by the processor 14 based upon a measured air speed. The measured air speed may be provided to the processor 14, for example, by conventional flight systems used to detect air speed.

In contamination instances, such as a high ice ridge formation on the control surface 27, the flap 24 is essentially sucked upward by lower pressure, changing the control surface hinge moment dramatically and leaving a pilot little time to react correctly. Therefore, the present sensor 10 must be able to sense impending problems before they occur, to give the pilot ample time to react and alter the control system.

Figure 4:
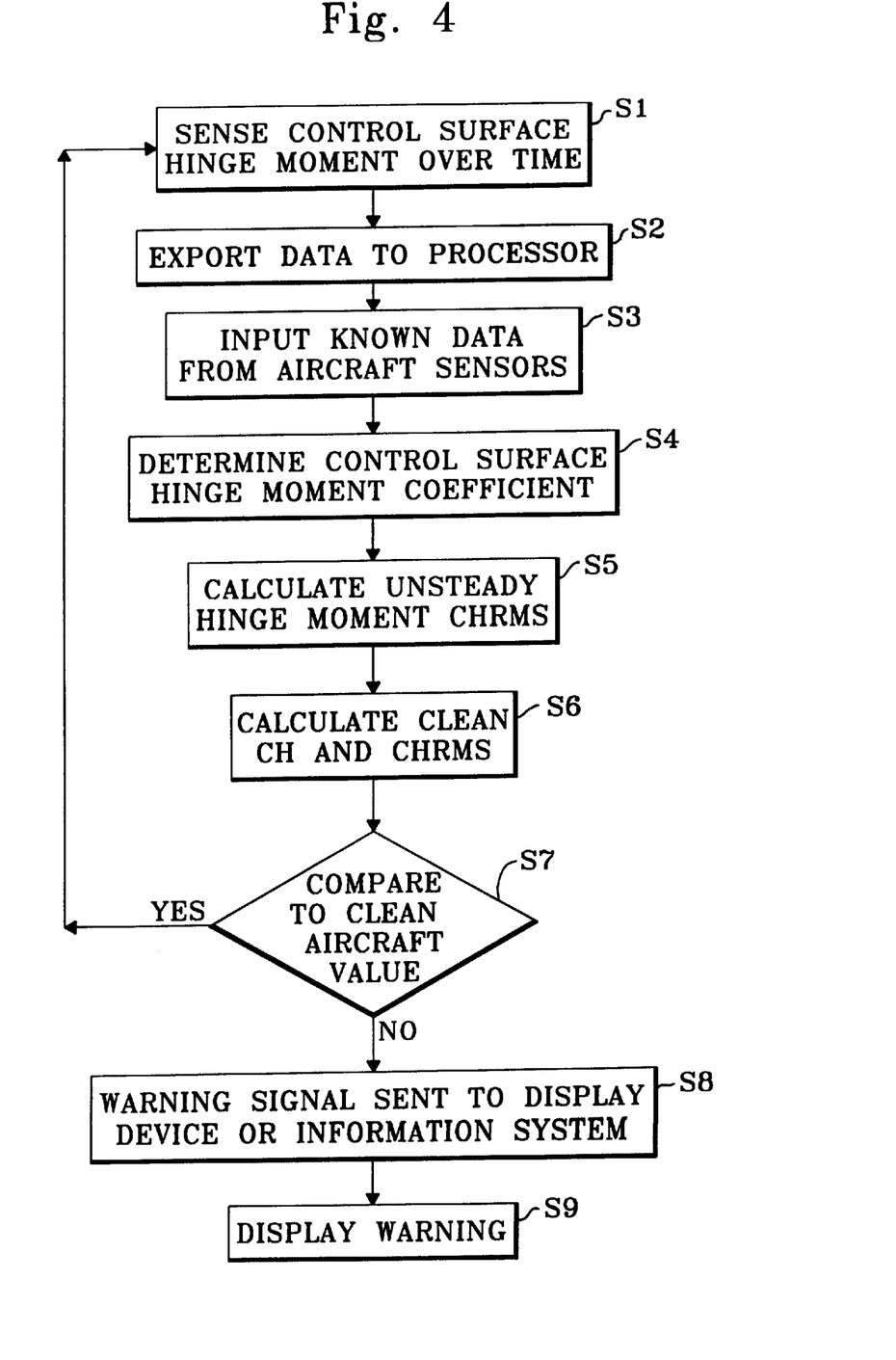
FIG. 4 is a flow chart illustrating the method of the invention.

Referring now to FIG. 4, a flow chart is shown to illustrate the preferred method used to alert the pilot to these surface contamination conditions before they occur. The detector 12 is located inside the control element, such as flap 24, at a location where it can sense the control surface hinge moment while being protected against plugging by ice or damage by contact with other debris. As mentioned earlier, this location keeps the sensor 12 safe, allowing it to measure data even in conditions where hail or ice may be striking the aircraft 20 without risk of damage.

Figure 5:
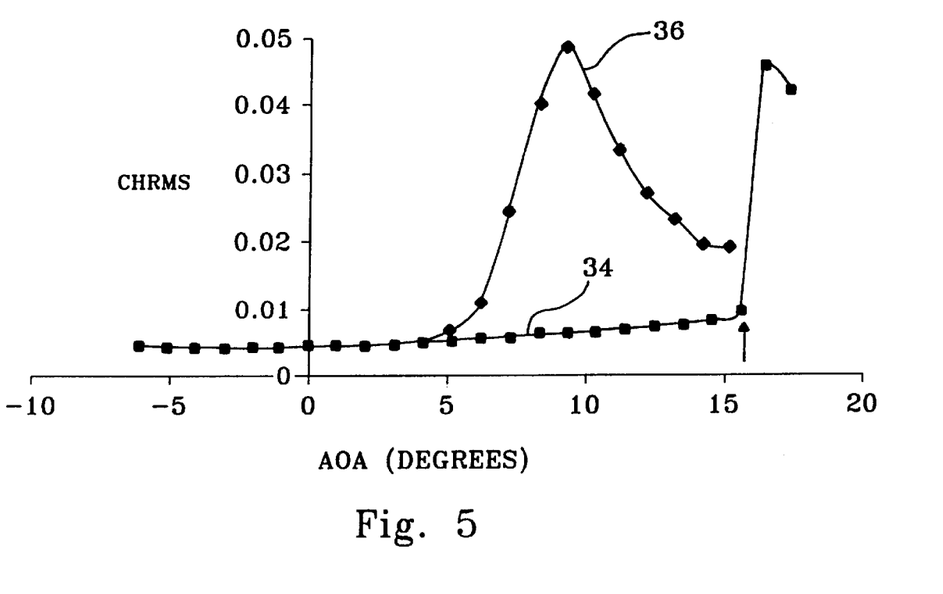
FIG. 5 is a graph depicting a function of an angle of attack and the constant value, variation value and critical value.

In step S1, the sensor 12 senses the hinge moment, indicated by arrow A in FIG. 2, about the control surface hinge line 26. This measurement represents the control surface hinge moment. Data concerning the moment is communicated, in step S2, to the processor 14 over some period of time. The steady hinge moment is nondimensionalized by the control surface area 30, the control chord length 32 and the dynamic pressure, which are stored for use by the processor 14. Step S4 determines a control surface hinge moment coefficient $C_h$. In step S5, the unsteady hinge moment $C_{hrms}$ is calculated from the fluctuations in the hinge moment. The typical behavior of $C_{hrms}$ for a clean and iced wing are shown in the graph in FIG. 5. In the preferred embodiment, $C_{hrms}$ is a root mean square function defined by the formula:

$$C_{hrms} = \sqrt{\frac{1}{N} \sum (C_h - \overline{C_h})^2}$$

where N represents the number of $C_h$ values taken and $\overline{C_h}$ represents the mean of the experimental distribution. In step S6, the processor 14 calculates a clean control surface hinge moment coefficient and a clean unsteady hinge moment. Although the preferred embodiment utilizes this function, any function which has an output that remains relatively constant until a point before surface contamination reaches a premature airfoil stall could be used.

The $C_{hrms}$ value is an accurate gauge of surface contamination because its value remains relatively constant or can be calibrated to the clean case. A variation in the value occurs at a high angle of attack in uncontaminated surface conditions, which is at a point where airfoil stall occurs. In situations where there is contamination on the surface, such as icing conditions, the $C_{hrms}$ value varies from the constant value at an angle of attack significantly less than where the airfoil stall occurs, allowing the pilot time before airfoil stall to adjust the controls. The $C_{hrms}$ value is graphed in FIG. 5. The graph demonstrates $C_{hrms}$ as a function of the angle of attack. The $C_{hrms}$ curve when there is no contamination is represented by line 34. The $C_{hrms}$ curve when surface contamination is present is represented by line 36. As shown in the graph, the value for both $C_{hrms}$ curves remains roughly the same until a sharp variation. In the case of no contamination, the variation occurs at angle of attack of 15.4 degrees, which is the location of airfoil stall (where the curve peaks) for that condition. However, in the case of the contaminated surface shown, the variation occurs at an angle of attack of 5 degrees, whereas the airfoil stall does not occur until 8 degrees. This allows for the pilot or another operator to be given a warning before the airfoil stall actually occurs, giving the pilot time to react.

Returning again to FIG. 4, after the $C_{hrms}$ is calculated, its value is compared against the constant value, which is calculated in the processor 14 in step S6 (S7). In the preferred embodiment, as discussed above, the value is 0.004, although it is contemplated that with other formulas and other aircraft the constant may be different. If the $C_{hrms}$ value matches the constant value, the program continues operating. However, if the $C_{hrms}$ deviates from the known value, a warning signal may be sent to the display device 16 in step S8. It is also contemplated that the signal could also be inputted into other aircraft information systems, where the signal would be integrated with other information. Upon receiving a signal, the display device 16 displays a warning signal in step S9 to the operator. Warnings such as a flashing light or an alarm are contemplated, as well as a screen display containing words such as WARNING and the amount of the deviation.

Since the warning occurs at an angle of attack before premature airfoil stall, the operator or pilot is given time to react, and can change flight controls to adjust to the situation. By changing controls at such an early stage, an accident may be avoided. The present invention is thus an improvement over other devices since it allows for real time communication with the pilot or operator, allowing for a warning to be sent before a dangerous level is reached. Also, since it is protected from environmental wear and measures the surface contamination effect over the entire wing, errors that occur due to the prior sensors are avoided.

The many advantages of this invention are now apparent. First, the sensing system is detecting the overall effect of the icing on the control surface, not just at localized points. Since it detects overall effects, the sensing system is more efficient and provides a better safeguard against icing than current sensing system. Current sensing systems can over-detect if the icing effects are greater at the sensing system than overall, alerting the pilot to a problem that may not exist. Even more problematic is the occurrence of under-detection. If the pressure at the sensor is at a normal level, but the overall pressure is at a dangerous level, the pilot will not be notified and loss of control of the aircraft may occur. These two problems are avoided in the present invention since it senses overall effects of surface contamination. Second, since the present invention may be located inside the aircraft, it is not vulnerable to the ice it is meant to protect against or other foreign objects which may fly against the wing, which is an improvement over the prior art. Third, the current system has the ability for an early warning. The warning may be displayed as soon as the function utilizing the control surface hinge moment coefficient deviates from the constant value. Such deviation occurs before control of the plane is lost, allowing the pilot to adjust the flight controls and to possibly avoid an accident.

While a preferred embodiment of the surface contamination sensing system has been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A method for sensing surface contamination on an aircraft, the aircraft having a control element with a control surface and control area, the control element being connected to a hinge, said method comprising the steps of:

sensing a control surface hinge moment about the hinge;

determining a control surface steady hinge moment coefficient by nondimensionalizing said control hinge moment by a control surface area, a dynamic pressure and a control surface chord length;

calculating a value which is dependent upon said control surface hinge moment coefficient, wherein said value remains at a relatively constant point during uncontaminated surface conditions on the control surface, said value varying from said constant point if the control surface becomes contaminated, said value varying before reaching a critical point, whereby said critical point occurs at a level of unsafe surface contamination on the control surface; and comparing said value of said control surface hinge moment coefficient against said relatively constant point to determine whether or not an unsafe control surface condition exists.

2. The method for sensing surface contamination on an aircraft according to claim 1, wherein said method further comprises displaying a warning to an operator when said value varies from said constant value, but before said calculated value reaches said critical point, thereby indicating a potential of an unsafe level of surface contamination occurring on the control surface before said critical point is reached.

3. The method for sensing surface contamination on an aircraft according to claim 2, wherein said step of displaying a warning occurs before said critical point, whereby said critical point is an angle of attack whereby an airfoil stall is created.

4. The method for sensing surface contamination on an aircraft according to claim 1, wherein said method further comprises sending a signal to a flight control system to be further analyzed when said value varies from said constant value, but before said calculated value reaches said critical point, thereby indicating a potential of an unsafe level of surface contamination occurring on the control surface before said critical point is reached.

5. The method for sensing surface contamination on an aircraft according to claim 1, wherein said step of calculating a value dependent on said hinge moment coefficient comprises a step of calculating an unsteady control surface hinge moment coefficient.

6. The method for sensing surface contamination on an aircraft according to claim 1, wherein said step of calculating a value dependent on said control surface hinge moment coefficient comprises a step of calculating a standard deviation of said control surface hinge moment.

7. The method for sensing surface contamination on an aircraft according to claim 6, wherein said step of calculating a standard deviation further comprises a step of calculating the following root mean square value:

$$C_{hrms} = \sqrt{\frac{1}{N}\sum (C_h - \overline{C_h})^2}$$

where $C_h$ is said control surface hinge moment coefficient, $\overline{C_h}$ is a mean of the experimental distribution, and N is the number of $C_h$ values summed.

8. A method for sensing surface contamination on an aircraft control surface, the method comprising the steps of:

sensing a control surface hinge moment about a hinge associated with the control surface;

calculating an unsteady control surface hinge moment; and determining whether an unsafe condition is associated with the control surface by comparing said unsteady control surface hinge moment to safe value hinge moment characteristics.

9. A sensing system for sensing surface contamination on an aircraft control surface according to claim 8 wherein said step of determining compares an amplitude of said unsteady control surface hinge moment to a safe hinge moment amplitude.

10. A sensing system for sensing surface contamination on an aircraft control surface, comprising:

a sensor for sensing a control surface hinge moment about a hinge connecting an element including the control surface to the aircraft; and a processor which receives hinge moment data from said sensor and determines a control surface steady hinge moment coefficient by nondimensionalizing said hinge moment by a control surface area, a dynamic pressure and control surface chord length; said processor calculating a value which is dependent on said control surface hinge moment coefficient, whereby said value remains at a relatively constant point during uncontaminated control surface conditions and varies from said relatively constant point if the control surface becomes contaminated.

11. The sensing system for sensing surface contamination on an aircraft control surface according to claim 10, wherein said value calculated varies before said value reaches a critical point, whereby said critical point occurs at a level of unsafe surface contamination on the control surface; and analyzing said value calculated of said control surface steady hinge moment coefficient against said constant point, which indicates a state of a safe level of surface contamination on the control surface.

12. The sensing system for sensing surface contamination on an aircraft control surface according to claim 10 whereby said sensing system further comprises a display device for displaying a warning to an operator when said value of said control surface steady hinge moment coefficient varies from said relatively constant point, whereby said variation from said relatively constant point indicates a potential of an unsafe level of surface contamination.

13. The sensing system for sensing surface contamination on an aircraft according to claim 12, whereby said display device displays said warning occurs before said critical value, whereby said critical value is an angle of attack which reaches a stall angle.

14. The sensing system for sensing surface contamination on an aircraft control surface according to claim 10, whereby said sensing system further comprises a flight control system for receiving a signal from an operator when said value of said control surface steady hinge moment coefficient varies from said relatively constant point, whereby said variation from said relatively constant point indicates a potential of an unsafe level of surface contamination.

15. The sensing system for sensing surface contamination on an aircraft control surface according to claim 10, wherein said processor computes an unsteady hinge moment of said control surface hinge moment.

16. The sensing system for sensing surface contamination on an aircraft according to claim 10, wherein said processor computes a standard deviation of said control hinge moment.

17. The sensing system for sensing surface contamination on an aircraft according to claim 10, wherein said processor computes a root mean square of said control surface hinge moment coefficient, using the formula:

$$C_{hrms} = \sqrt{\frac{1}{N}\sum(C_h - \overline{C_h})^2}$$

where $C_h$ is said control surface steady hinge moment coefficient, $\overline{C_h}$ is a mean of the experimental distribution, and N is a number of control surface steady hinge moment coefficients measured.

18. A method for sensing surface contamination on an aircraft control surface, the method comprising the steps of:

sensing a control surface hinge moment about a hinge associated with the control surface;

determining a control surface steady hinge moment coefficient;

determining whether an unsafe condition is associated with the control surface by comparing said steady hinge moment coefficient to a steady moment coefficient indicative of a safe condition.

* * * * *